Oct. 17, 1939.　　H. REDFERN ET AL　　2,176,149
DEVICE FOR HOLDING HAMS OR THE LIKE
Filed April 30, 1938
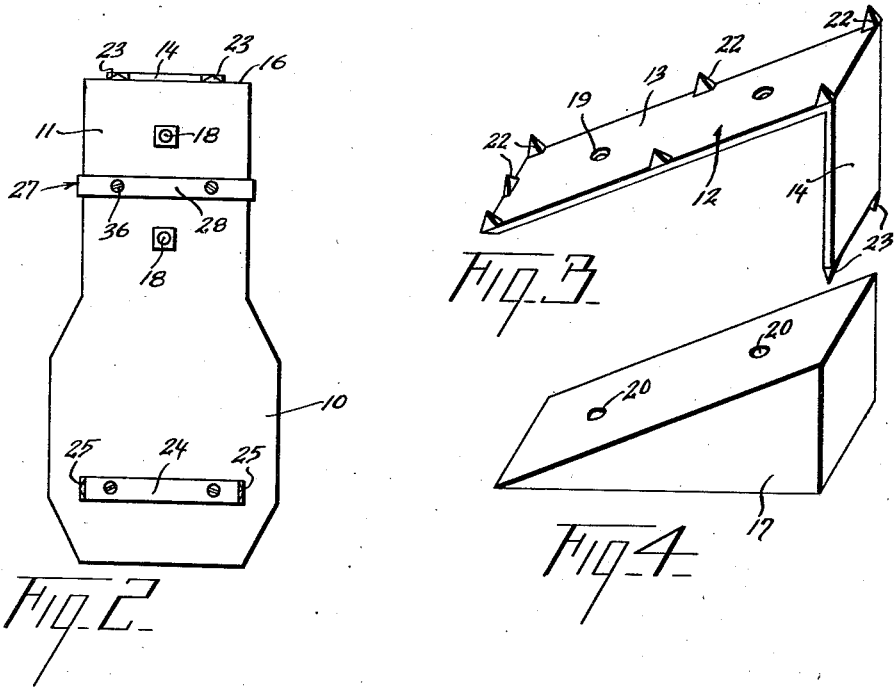
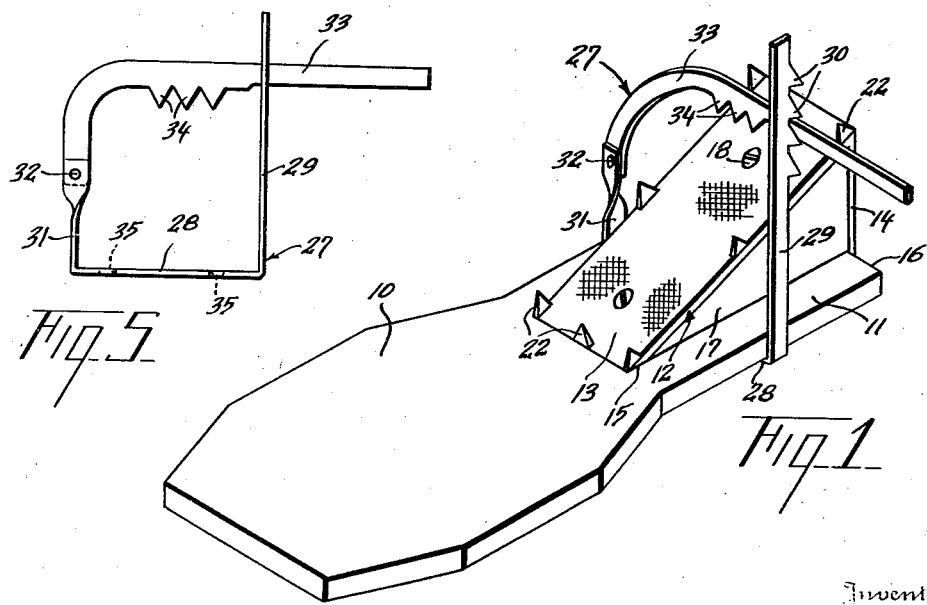
Inventors
Hubert Redfern
Otis Lovic Blackburn
By Carl Miller
Attorney Patented Oct. 17, 1939

2,176,149

UNITED STATES PATENT OFFICE 2,176,149

DEVICE FOR HOLDING HAMS OR THE LIKE

Hubert Redfern and Otis Lovic Blackburn, Linden, Tex.

Application April 30, 1938, Serial No. 205,261

1 Claim. (Cl. 146—218)

This invention relates to improvements in means for slicing and sawing of cured or dry hams.

As is well known hams are almost round and when placed on a meat block to be sliced, they are very difficult to hold while being cut and sawed, as the grease on the ham gets on the meat block, making the block slippery which causes the ham to slide on the meat block thus rendering it more difficult to hold while being sliced or sawed. When about two thirds of the ham is cut and sliced off, the weight of the shank of the ham pulls it over out of position, making it very difficult to cut. The principal object of this invention is therefore to provide a portable holding device adapted to receive thereon a ham or the like and which is provided with means for supporting the shank of the ham and for clamping the same in place, the device being further provided with tooth-like members for holding the same in position when placed on a supporting surface such as a meat block.

With the above and other objects in view, reference is had to the accompanying drawing wherein:

Figure 1 is a perspective view of the device.

Figure 2 is a bottom plan view thereof.

Figure 3 is a perspective view of the metallic supporting plate.

Figure 4 is a perspective view of the wood filler block, and

Figure 5 is an elevational view of the adjustable clamping mechanism.

Referring to the drawing in detail, the ham clamping device or machine is provided with a base 10 and an integral preferably rectangular extension 11. The base 10 which is of a size sufficient to have a ham placed thereon may be of any desired shape, the extension 11 being of less width than said base and over which the shank of the ham is to be positioned. Arranged on the extension 11 is a metallic shank supporting plate 12 formed to provide an inclined shank supporting surface 13 which is preferably roughened or serrated and a vertical back 14. The forward edge 15 of the plate 12 is mitered so as to lie flush on the surface of the extension 11, and the back 14 is made of such a length as to engage in abutting relation the rear transverse edge 16 of the extension 11.

Fitted snugly within the plate 12 is a wedge-shaped wooden filler block 17 of the same width as said plate, and serving as a rigid foundation for the plate, both said plate and block being rigidly fastened to the extension 11 by bolts 18 extending through the openings 19 and 20, respectively provided in said plate and block.

Provided along the edge of the plate 12 and projecting above the surface 13 thereon are a plurality of teeth or spikes 22 adapted to bite into the ham or shank thereof to hold the same in position when the latter is placed on the base 10 with the shank portion resting on the plate 12. The lower edge of the back 14 of the plate 12 is provided with a pair of similar projecting teeth or spikes 23, and arranged on the bottom of the base 10 is a transverse metal bar or strap 24 provided at its ends with projecting teeth or spikes 25. It will be observed that the teeth or spikes 23 of the back 14 project beyond the bottom surface of the base 10, whereby when said base is placed on a meat block the teeth or spikes 23 and 25 will bite thereinto to hold the base 10 securely in place.

Fitted to the base 10 is an adjustable clamp 27, comprising a transverse bar 28 arranged to seat on the under side of the base 10, said transverse bar having at one end thereof a vertical lock bar 29 provided with a vertical row of ratchet teeth 30, and at its other end with a vertical support bar or post 31 to the upper end of which is pivotally connected as at 32 one end of an adjustable clamping bar 33. The vertical post or support bar 31 and vertical lock bar 29 engage the side edges of the extension 11 and project upwardly above the base 10, the clamp 27 being so arranged relative to said base, that the clamping bar 33 will extend transversely across the plate 12 substantially midway between the ends thereof. Provided on the clamp bar 33 are a plurality of depending teeth or spikes 34 which are so positioned thereon as to extend across the plate 12 regardless in what position the clamping bar is placed. In order to rigidly secure the clamp 27 to the base 10, the transverse bar 28 thereof is provided with spaced openings 35 for the reception of screws or bolts 36.

In use the ham clamping machine operates as follows: The machine is placed on any suitable surface such for example as a butcher's meat block, and the ham is placed on the base 10 of the machine with the shank resting on the surface 13 of the supporting plate 12. The clamping bar 33 is moved down into clamping engagement with the shank of the ham and is locked in place by proper contact with one of the ratchet teeth 30. In this clamped position the teeth 22 on the plate 12 and the teeth 34 on the clamping bar will bite into the shank of the ham to thereby securely hold the same in place. As held in this manner, it becomes a simple matter to safely, economically and quickly slice off as much ham as desired. Furthermore, the base 10 of the machine is rendered immovable by virtue of the teeth 23 and 25 biting into the surface of the meat block.

As will be understood, there may be slight changes made in the construction and arrangement of the details of the invention without departing from the field and scope of the same as fall within the scope of the appended claim.

Having thus described our invention, we claim as new and desire to secure by Letters Patent:

A device for holding a ham or the like preparatory to slicing or sawing the same comprising a flat elongated base provided with a flat rectangular extension formed co-extensive therewith, a metallic supporting plate including an inclined plate portion and a vertical back portion positioned on said extension with said back portion engaging at its lower end the transverse edge of said extension remote from said base and said inclined plate extending towards said base portion, a wedge shaped filler block fitted between said supporting plate and said extension and fastening means passing through said inclined plate, filler block and extension for rigidly securing said supporting plate thereto; and a clamping device including an adjustable clamping bar connected to said extension, said clamping bar being superposed with relation to said inclined plate portion and extending transversely across the same whereby to clamp therebetween the shank portion of said ham, wherein the lower edge of the vertical back portion of said supporting plate is provided with a plurality of teeth or spikes projecting beneath the underside of said extension, and a bar provided with a plurality of teeth or spikes attached to the underside of said base whereby to hold said base and extension against movement in any direction when the same are placed on a supporting surface.

HUBERT REDFERN.
OTIS LOVIC BLACKBURN.